J. R. BECKETT.
THREAD MILLING ATTACHMENT FOR LATHES.
APPLICATION FILED OCT. 14, 1918.

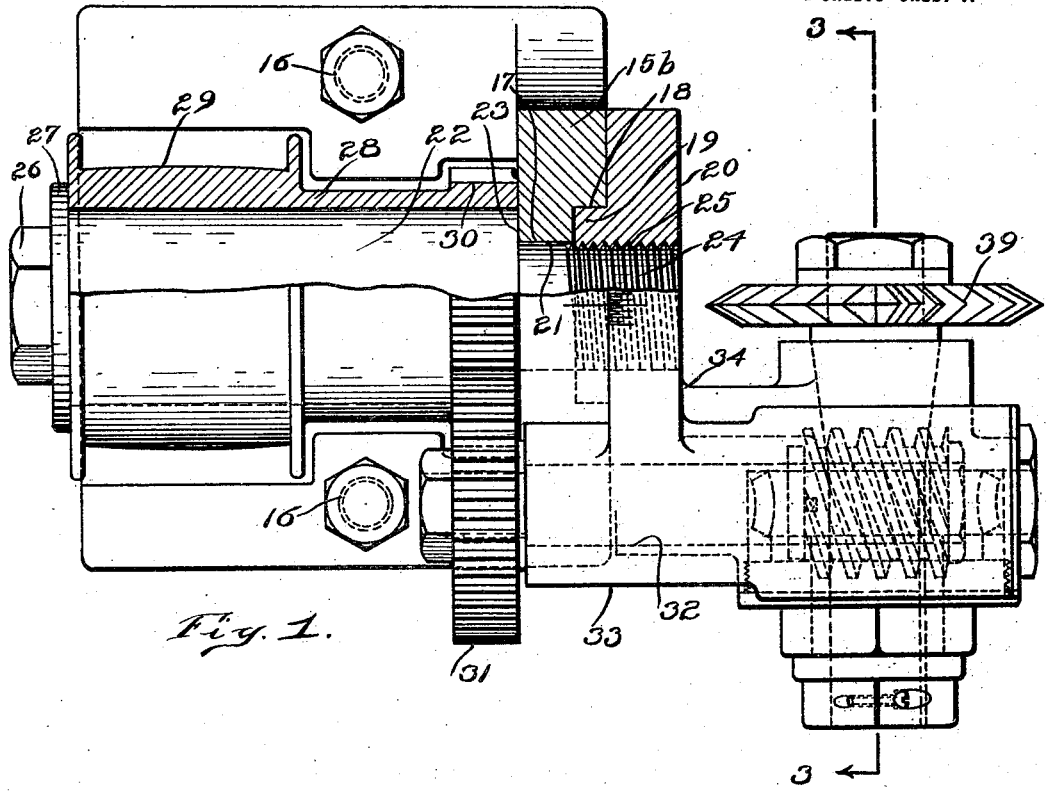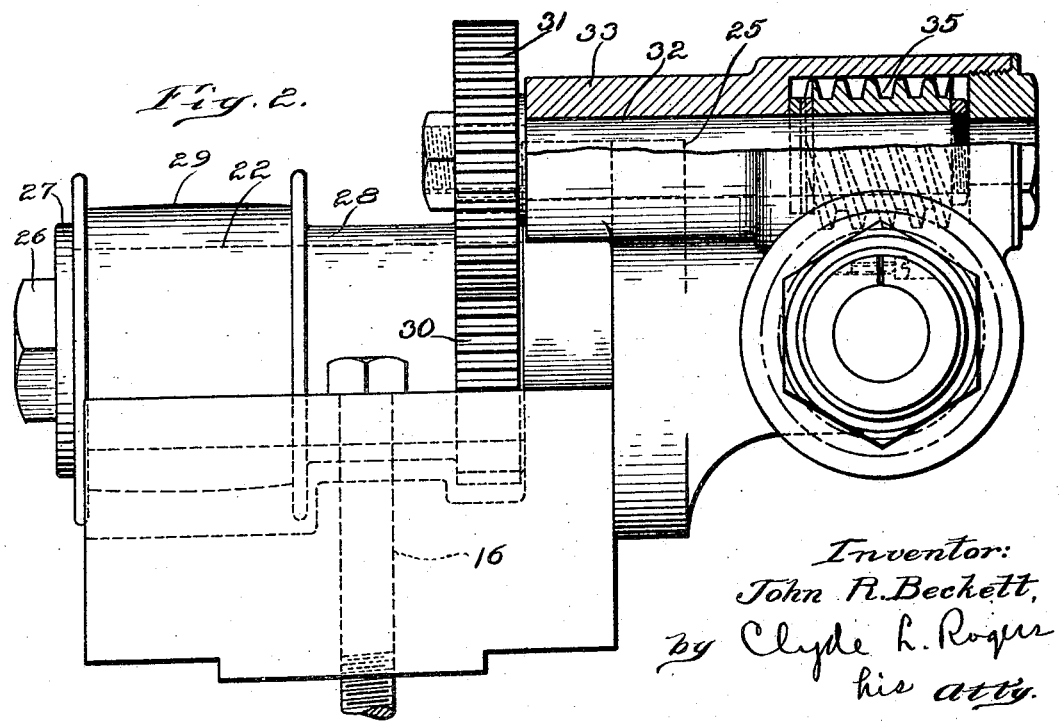

1,414,853.

Patented May 2, 1922.
2 SHEETS—SHEET 2.

Inventor:
John R. Beckett,
by Clyde L. Rogers
his atty.

UNITED STATES PATENT OFFICE.

JOHN R. BECKETT, OF SOMERVILLE, MASSACHUSETTS.

THREAD-MILLING ATTACHMENT FOR LATHES.

1,414,853.   Specification of Letters Patent.   Patented May 2, 1922.

Application filed October 14, 1918. Serial No. 257,967.

*To all whom it may concern:*

Be it known that I, JOHN R. BECKETT, a citizen of the United States, and resident of Somerville, county of Middlesex, Commonwealth of Massachusetts, have invented an Improvement in Thread-Milling Attachments for Lathes, of which the following description, in connection with the accompanying drawings, is a specification, like characters on the drawings representing like parts in each of the several views.

This invention relates to attachments for lathes and particularly to an attachment adapted for cut screw threads or other spiral cuts on a rotating work piece by the use of a milling cutter. A prime object of the invention is to provide an attachment of this kind wherein the milling cutter is mounted with a capability of quick and easy adjustment to different angles with respect to the rotating work piece so that threads or spirals of different inclinations and either right or left hand pitch may be readily produced, the cutter being held at all times and throughout its range of adjustments correctly and accurately positioned with respect to the work piece. A further important object is to provide an attachment of the kind stated wherein the cutter while freely adjustable is mounted so as to be held rigid and secure against chattering and vibration, this being attained by a mounting for the cutter which affords a direct and stiff backing to the cutter at all times. A further object is to provide an attachment of the kind stated that is exceedingly simple, compact and reliable in operation, capable of being mounted on the tool slide and in place of the usual tool post of an ordinary lathe and having provision whereby the driving connection to the milling cutter is undisturbed and unaffected throughout the range of angular adjustments that may be given to the tool for setting it according to the required angle of the thread or other spiral cut to be made. The foregoing and other objects and advantages of the invention will more fully appear from the following detailed description, and the distinctive features of novelty will be pointed out in the appended claims.

Referring to the drawings:

Fig. 1 is a plan view with a part broken away in horizontal section, showing an attachment constructed in accordance with my invention;

Fig. 2 is a side view thereof with a part broken away in section;

The bed ways of an ordinary or usual lathe are indicated at 10 having mounted thereon a usual or suitable lathe carriage 11 equipped with a cross slide 12. The tool block 13 on this slide is equipped with a usual undercut T-slot 14 according to common practice for receiving the tool post of the lathe.

Figure 3:
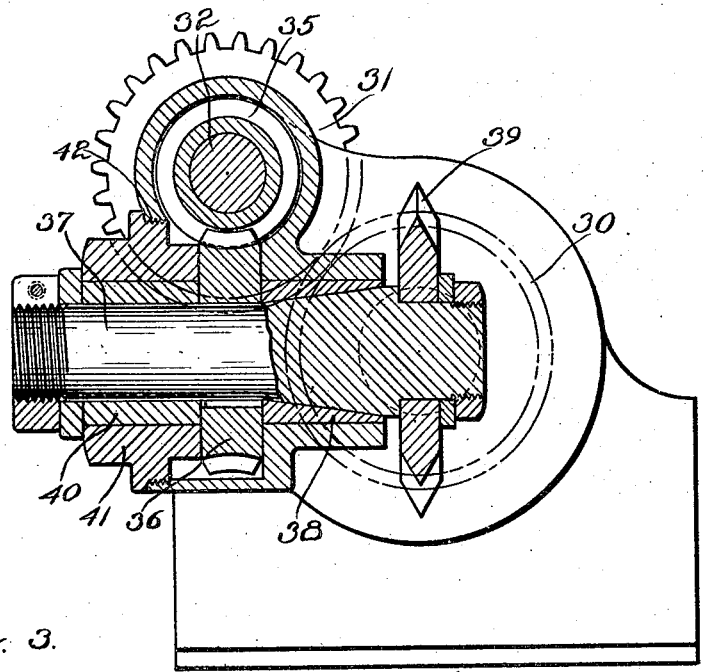
Fig. 3 is a transverse section on line 3—3 of Fig. 1.
Figure 4:
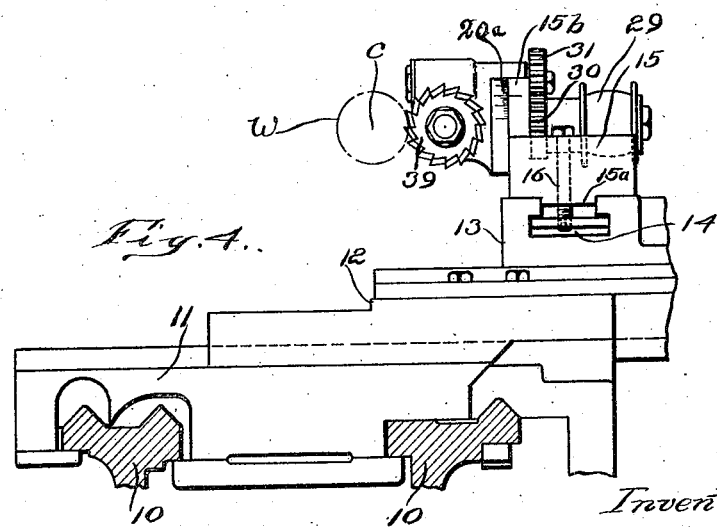
Fig. 4 is a side elevation of my improved attachment showing the same applied to a lathe with a portion of a lathe bed in transverse section.

In accordance with my invention in place of the usual tool post a head 15 constituting the base of the present attachment is secured to the block 13 by suitable clamping bolts 16, the head 15 preferably having its bottom formed to fit the top of the block 13 with a projection 15$^a$ extending some little into the slot 14 to position accurately said head on said block. The head 15 has at the front thereof an upward extension 15$^b$ with a bolt receiving passage 17 therethrough and the outer face thereof formed with a recess seat 18 around such passage to receive a short hub 19 formed on one arm 20 of an angle bracket which carries the tool. Fitted through the passage 17 is a reduced extension 21 of a bearing pin or bolt 22 which has the shoulder 23 adapted to fit against the inner face of the extension 15$^b$, the outer extremity of said extension 21 being threaded as seen at 24 and screwed into a threaded hole 25 of the arm 20. Thus as the pin 22 is turned up, the arm 20 of the tool carrying bracket is clamped rigidly and securely to the upward extension 15$^b$ of the base 15. The outer end of the pin 22 is formed with a squared head 26 or like formation permitting convenient turning adjustment of said pin and just within such squared head it is equipped with a retaining flange 27 adapted to hold in place a sleeve 28 which is journaled on the pin 22 and is formed at its outer portion with a driving pulley 29 and at its inner portion with a gear 30. The full length of this sleeve 28 is such as to just fit between the outer face of the extension 15$^b$ and the flange 27 when the shoulder 23 is clamped against said face and thus said driving sleeve 28 is held in alinement and against displacement. The gear 30 is in driving engagement with another gear 31 fixed at the inner end of a shaft 32 which is journaled in a sleeve 33 which is rigid and preferably integral with the arm 20 and constitutes therewith the tool holding bracket designated as a whole 34. The shaft 32 has fixed on its outer portion a worm 35 which meshes with a worm wheel 36 fast on the cutter arbor 37. The cutter arbor 37 is mounted in suitable bearing bushings transversely at the outer end of the sleeve 33, the outer one of these bushings being the usual cone bearing type as seen at 38 and supporting the cutter arbor up closely adjacent to the milling cutter 39 which is secured in usual manner to the outer end of said arbor. The inner bearing 40 of the cutter arbor may be carried in a removable nut head 41 which is removably threaded into the bracket mounting as seen at 42 and is of a size to afford clearance for the insertion of the worm gear 36 in the assembling of the mechanism. It is to be noted that the cutter arbor 37 is mounted to extend radially inward of the bracket arm 20 to an extent so that the transverse center of the milling cutter 39 is precisely in the center of the pin 22, i. e., in the axis of angular adjustment of the arm 20 and likewise that said cutter arbor is mounted so that its center always intersects at right angles the center of angular adjustment of said arm 20. Thus by loosening the pin 22 the bracket arm 20 may be adjusted and set at any required angle with respect to the base 15 for holding the milling cutter so as to cut either right or left hand spirals and at any desired angle. By reference to Fig. 4 it will be seen that the mounting of the milling cutter as described and on its base 15 is such that when it is mounted on the block 13 it is directly opposite and with its center in the horizontal plane of the lathe center C and in position to act on the work piece W. To facilitate the described angular adjustment of the cutter holding bracket, the arm 20 which is preferably laterally extended to a disc outline, has graduations 20$^a$ formed on the periphery thereof with a determining mark on the member 15$^b$ to co-operate therewith as is usual. By the construction described I thus obtain a mounting for the cutter that affords a very stiff and rigid backing capable of transmitting thrusts and pressures directly on to the tool block 13 and in a manner to eliminate chattering and vibration, and likewise the described driving connections for rotating the cutter are simple, direct and powerful, minimizing the possibility of backlash and vibration trouble from this source.

While I show herein the drive as imparted from a belt pulley 29 it is to be understood that this is merely illustrative of any suitable drive, and in general the present embodiment is to be understood as illustrative and not restrictive, reference being had to the appended claims rather than to the foregoing description to indicate the scope of the invention.

Having described my invention, what I claim as new and desire to secure by Letters Patent is:

1. A milling attachment for lathes bodily attachable to and detachable from the lathe carriage as a separate unit, comprising a base having journaled therein a driving member bearing a spur pinion and having provision for clamping to the tool post block of a lathe, a tool holding bracket mounted for angular adjustment about an axis concentric with said driving member, a shaft journaled in said bracket having fixed therein a gear meshing with said pinion throughout the range of angular adjustment of said bracket, a worm also fixed on said shaft, and a milling cutter mounted on said bracket having rigid therewith a worm wheel meshing with said worm, said milling cutter mounted so that the axis of adjustment of said bracket extends diametrically and transversely central thereof.

2. A milling attachment for lathes constituting a separate unit attachable to and detachable from the lathe carriage, comprising a base equipped with a driving member and having provision for clamping to the tool post block of a lathe, and a milling cutter in geared connection with said driving member and mounted for angular adjustment on said base, said geared connection consisting in a worm wheel mounted to turn with said milling cutter and a worm engaging said worm wheel and actuated by said driving member, the axis of said angular adjustment being concentric with said driving member and also in a line passing diametrically of the cutter.

3. A milling attachment for lathes constituting a distinct unit attachable to and detachable from the lathe carriage, comprising a base equipped with provision for clamping to the tool post block of a lathe, a driving member journaled to said base, a tool holding bracket mounted for angular adjustment about an axis concentric with said driving member, and a milling cutter mounted on said bracket and in geared connection with said driving member throughout the range of angular adjustment of said bracket, the axis of said bracket passing diametrically of the cutter.

4. A milling attachment for lathes constituting a separate unit attachable to and detachable from the lathe carriage, comprising a base equipped with a driving member, a tool holding bracket mounted for angular adjustment on said base, and means for clamping said bracket in adjusted position, said means also constituting a mounting for said driving member, and a milling tool carried by said bracket and mounted on an arbor at right angles to the axis of adjustment of said bracket, the axis of adjustment of said bracket extending diametrically of the cutter and centrally of the thickness thereof.

5. A milling attachment for lathes constituting a separate unit attachable to and detachable from the lathe carriage, comprising a base equipped with a driving member and having provision for clamping to the tool post block of a lathe, and a milling cutter in geared connection with said driving member and mounted for angular adjustment on said base, the axis of said adjustment being concentric with said driving member and also in a line passing diametrically of the cutter and centrally of the thickness thereof.

6. A milling attachment for lathes bodily attachable to and detachable from the lathe carriage, comprising a base equipped for fitting to the tool post block of a lathe, a driving member journaled to said base, said base having an upright extension, a tool holding bracket having an arm applied to said extension and fitted for angular adjustment thereon, and a milling cutter mounted in said bracket on an axis transverse to the axis of adjustment of said bracket, the axis of adjustment of said bracket extending diametrically of said cutter, and connections from said driving member to said cutter consisting in an intermediate shaft geared to said driving member and having a worm and worm wheel driving connection with the cutter arbor.

In testimony whereof, I have signed my name to this specification.

JOHN R. BECKETT.